(12) United States Patent
Matsui

(10) Patent No.: US 8,746,738 B2
(45) Date of Patent: Jun. 10, 2014

(54) AIRBAG FOLDING METHOD AND AIRBAG APPARATUS

(71) Applicant: Yoshitaka Matsui, Tokyo (JP)

(72) Inventor: Yoshitaka Matsui, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/712,082

(22) Filed: Dec. 12, 2012

(65) Prior Publication Data

US 2013/0154246 A1    Jun. 20, 2013

(30) Foreign Application Priority Data

Dec. 15, 2011  (JP) ................................ 2011-274773

(51) Int. Cl.
  *B60R 21/237*    (2006.01)
(52) U.S. Cl.
  USPC ................. 280/743.1; 280/732; 280/730.1
(58) Field of Classification Search
  USPC ............................ 280/732, 743.1, 730.1, 729
  See application file for complete search history.

(56) References Cited

U.S. PATENT DOCUMENTS

| | | | | |
|---|---|---|---|---|
| 6,834,886 B2 * | 12/2004 | Hasebe et al. | ............. | 280/743.1 |
| 7,404,575 B2 * | 7/2008 | Bito et al. | ................. | 280/743.1 |
| 7,584,994 B2 * | 9/2009 | Narimoto et al. | .......... | 280/743.1 |
| 7,708,311 B2 * | 5/2010 | Bito | .............................. | 280/732 |
| 8,523,223 B2 * | 9/2013 | Miyata | .......................... | 280/732 |
| 2006/0049618 A1 * | 3/2006 | Bito | .............................. | 280/732 |
| 2011/0042922 A1 * | 2/2011 | Miyata | ....................... | 280/730.1 |
| 2012/0126515 A1 * | 5/2012 | Miyata | ....................... | 280/730.1 |

FOREIGN PATENT DOCUMENTS

| | | |
|---|---|---|
| JP | 6050267 Y2 | 12/1994 |
| JP | 2620023 B2 | 3/1997 |
| JP | 3428099 B2 | 5/2003 |
| JP | 2007-45190 A | 2/2007 |
| JP | 2010-274901 A | 12/2010 |
| JP | 2011-42195 A | 3/2011 |

* cited by examiner

*Primary Examiner* — Drew Brown
(74) *Attorney, Agent, or Firm* — Fitch, Even, Tabin & Flannery, LLP

(57) ABSTRACT

There is provided an airbag folding method for folding an airbag. The method includes in the following order: (a) folding the inner panel and the outer panel into a symmetrical substantially rectangular shape such that a groove of the concave region is located along a center line, wherein the center line passes through a center of the introduction port and symmetrically divides the inner and outer panels; (b) folding the inner and outer panels along fold lines from right and left edges thereof toward the center line, wherein the fold lines are substantially parallel to the center line; and (c) folding and rolling up the inner and outer panels from both ends of the center line toward the introduction port.

4 Claims, 21 Drawing Sheets

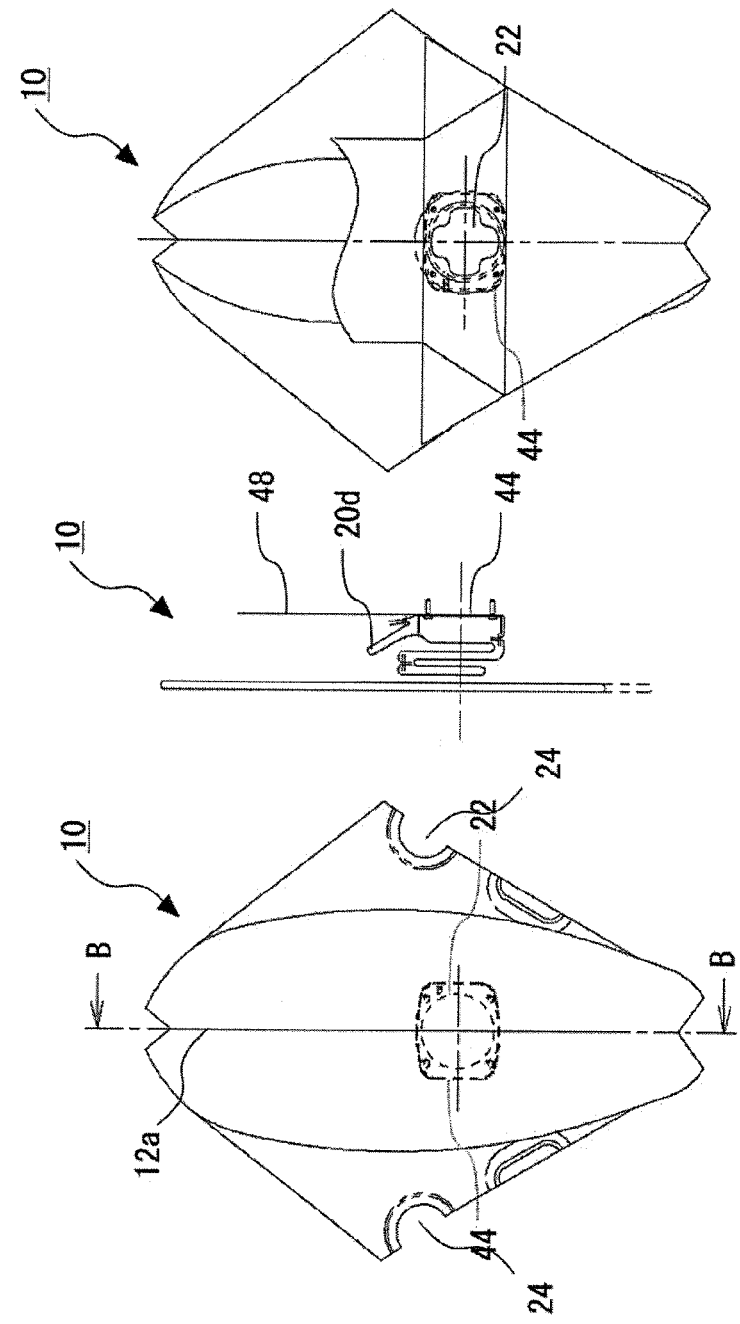

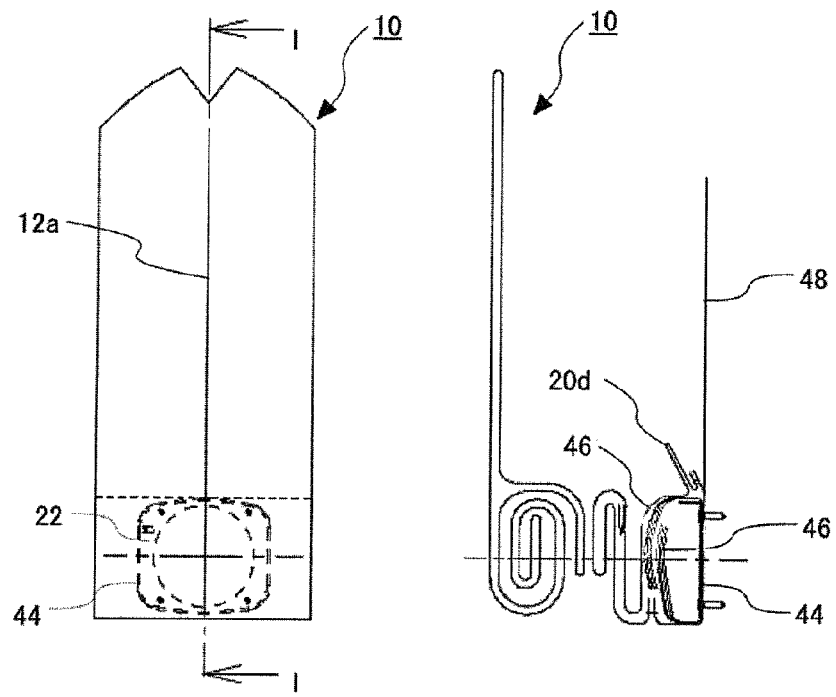

FIG. 19A  FIG. 19B
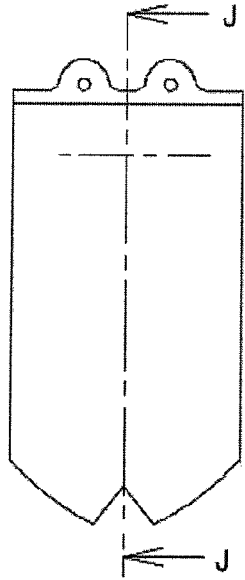
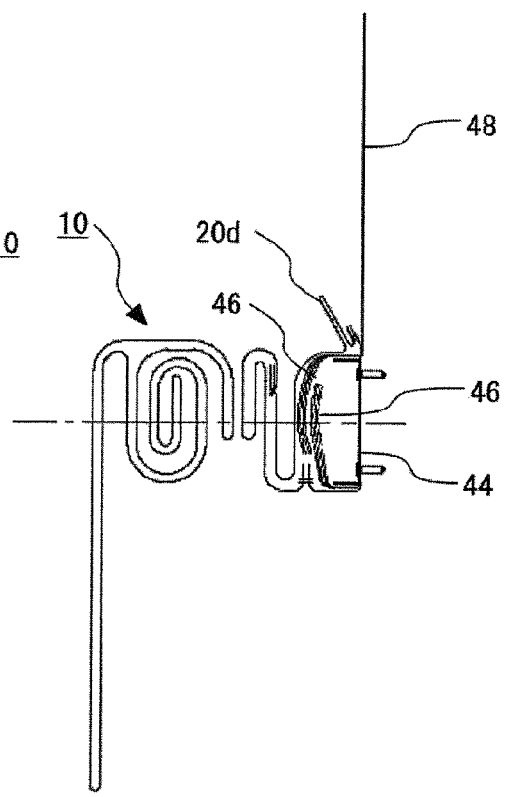

FIG. 20A
FIG. 20B
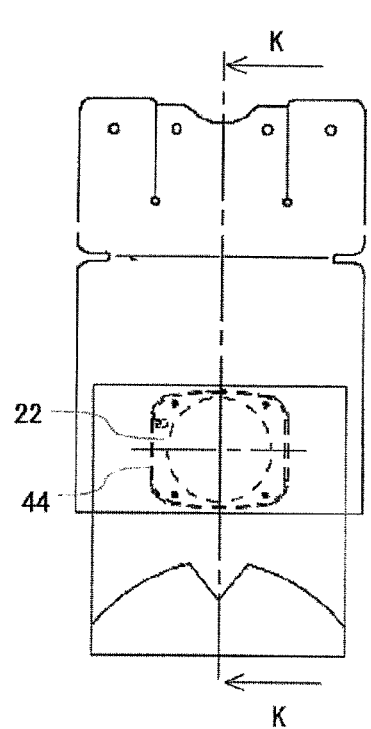
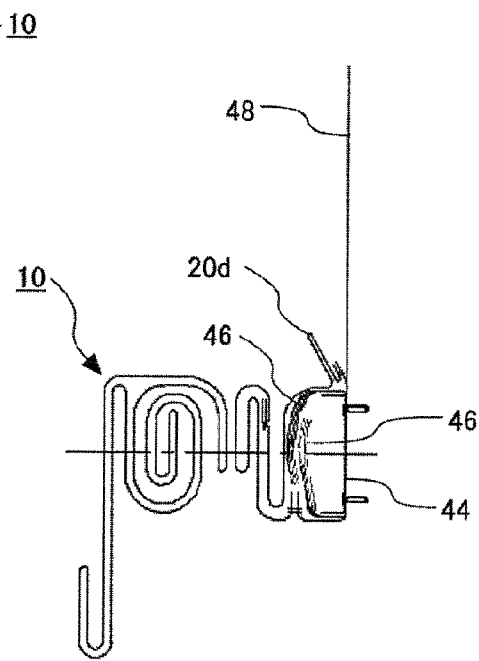

FIG. 21A
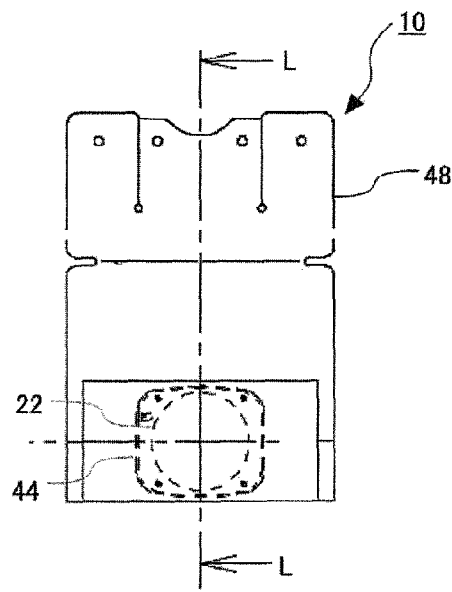
FIG. 21B
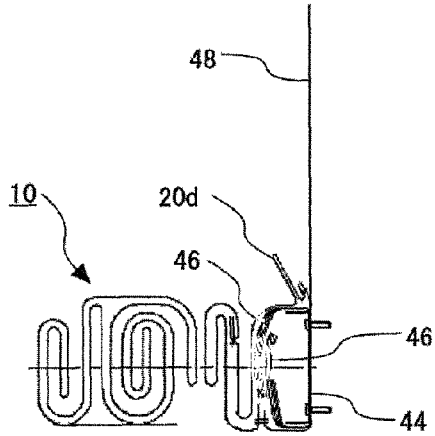
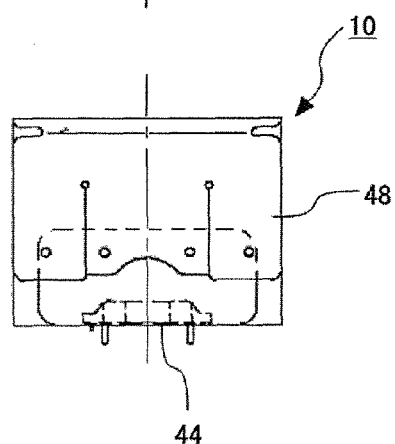
FIG. 21C

US 8,746,738 B2

AIRBAG FOLDING METHOD AND AIRBAG APPARATUS

This application claims priority from Japanese Patent Application No. 2011-274773, filed on Dec. 15, 2011, the entire contents of which are hereby incorporated by reference.

BACKGROUND

1. Technical Field

The present disclosure relates to airbag folding methods and airbag apparatuses, and in particular relates to an airbag folding method and an airbag apparatus which are capable of improving storability (package volume).

2. Related Art

A vehicle such as an automobile is equipped with an airbag apparatus for inflating and deploying an airbag in a cabin at the time of an emergency such as collision or sudden deceleration, thereby absorbing impact applied to an occupant. An airbag apparatus generally has: an airbag that is folded in normal times and is inflated and deployed at the time of an emergency; an inflator for supplying pressure gas to the airbag; a retainer for storing the folded airbag and for supporting the inflator; and an airbag cover that holds the retainer and forms an opening through which the airbag is inflated outward.

At the time of collision or sudden deceleration of a vehicle, pressure gas is supplied to the airbag from the inflator to inflate the airbag; then, the airbag cover is split open, and the airbag is inflated and deployed while being inflated outward to the cabin. In particular, when such an airbag apparatus is used for a passenger's seat, the airbag is inflated and deployed to space surrounded by an instrument panel, a wind shield (front window panel) and an occupant.

Known examples of such an airbag include one in which a concave region is formed along a vertical direction in a portion of the airbag, facing an occupant, in an inflated and deployed state in particular (see e.g., JP-A-2010-274901). The concave region extending along the vertical direction defines: a left chamber located forward of a left half of the occupant's body; and a right chamber located forward of a right half of the occupant's body. The concave region is located between the right and left chambers.

However, when the above-mentioned right and left chambers are formed, the airbag has to be widened in a vehicle body width direction at the time of inflation and expansion, thus increasing the airbag in size. Further, sewing of a base cloth of the airbag is complicated in order to form the right and left chambers and to allow the occupant to be also received by the concave region, thus also complicating folding of the airbag when it is stored.

Accordingly, the base cloth is complicated in shape to have a certain thickness even before expansion, and is thus increased in size; as a result, a package volume of the airbag when it is stored is disadvantageously increased.

When the package volume is increased as mentioned above, it is extremely difficult for an installation space of a narrow instrument panel, for example, to store the airbag.

SUMMARY OF THE INVENTION

It is one of illustrative aspects of the present invention to provide an airbag folding method and an airbag apparatus which are capable of preventing an increase in package volume (i.e., an increase in thickness) when an airbag is stored.

According to one or more illustrative aspects of the present invention, there is provided an airbag folding method for folding an airbag. The airbag is formed in a bag shape and, when inflated and deployed, comprises: an outer panel formed in a substantially symmetrical shape and comprising: a right outer wall surface; a left outer wall surface; and an introduction port for a pressure gas provided between the right outer wall surface and the left outer wall surface; and an inner panel formed in a substantially symmetrical shape and joined to the outer panel at a peripheral edge of the outer panel and comprising: a right inner wall surface and a left inner wall surface facing the right inner wall surface, wherein a concave region is formed between the right inner wall surface and the left inner wall surface. The airbag is folded in normal state and inflated and deployed in an emergency state by introducing the pressure gas to the airbag through the introduction port. The method comprises in the following order: (a) folding the inner panel and the outer panel into a symmetrical substantially rectangular shape such that a groove of the concave region is located along a center line, wherein the center line passes through a center of the introduction port and symmetrically divides the inner and outer panels; (b) folding the inner and outer panels along fold lines from right and left edges thereof toward the center line, wherein the fold lines are substantially parallel to the center line; and (c) folding and rolling up the inner and outer panels from both ends of the center line toward the introduction port.

According to one or more illustrative aspects of the present invention, there is provided an airbag folding method for folding an airbag. The airbag is formed in a bag shape and, when inflated and deployed, comprises: an outer panel formed in a substantially symmetrical shape and comprising: a right outer wall surface; a left outer wall surface; and an introduction port for a pressure gas provided between the right outer wall surface and the left outer wall surface; and an inner panel formed in a substantially symmetrical shape and joined to the outer panel at a peripheral edge of the outer panel and comprising: a right inner wall surface and a left inner wall surface facing the right inner wall surface, wherein a concave region is formed between the right inner wall surface and the left inner wall surface. The airbag is folded in normal state and inflated and deployed in an emergency state by introducing the pressure gas to the airbag through the introduction port. The method comprises in the following order: (a) folding the inner panel and the outer panel into a symmetrical substantially rectangular shape such that a groove of the concave region is located along a center line and the introduction port is located adjacent to one end of the center line, wherein the center line passes through a center of the introduction port and symmetrically divides the inner and outer panels; (b) folding back a rear surface side of the inner and outer panels which is adjacent to the introduction port along a first fold line while the center line is not deviated from the groove of the concave region, wherein the first fold line is defined as a line orthogonal to the center line and connecting right and left vertexes of the substantially rectangular shape; (c) folding and rolling up the inner and outer panels along second fold lines from right and left edges thereof toward the center line symmetrically at the same width, wherein the second fold lines are substantially parallel to the center line; and (d) folding and rolling up the inner and outer panels along third lines from both ends of the center line toward the introduction port, wherein the third fold lines are substantially orthogonal to the center line.

According to one or more illustrative aspects of the present invention, in the steps (c) and (d), the inner and outer panels are rolled up between the introduction port and an airbag surface constituting the concave region.

According to one or more illustrative aspects of the present invention, in the step (a), a region of the outer panel, corresponding to a vehicle front side region of the introduction port, is extended from a vehicle front side edge of the introduction port toward the vehicle front side region, and then is folded back toward a vehicle rear side region. The step (d) comprises forming an unfolded region of the inner and outer panels as a gas storage portion formed in a bag shape in a cross-section.

According to one or more illustrative aspects of the present invention, there is provided an airbag apparatus. The airbag comprises: the airbag which is folded by the above-described method; an inflator configured to supply a pressure gas to the airbag so as to inflate and deploy the airbag; a retainer in which the folded airbag is housed, the retainer being configured to support the inflator; and an airbag cover configured to hold the retainer and having an opening through which the airbag is inflated outward.

BRIEF DESCRIPTION OF DRAWINGS

FIG. 11A is a front view of the airbag, illustrating an airbag shape upon completion of a second folding process for the airbag according to one embodiment of the present invention;

FIG. 11B is a cross-sectional view taken along the line B-B of FIG. 11A, illustrating the airbag shape upon completion of the second folding process;

FIG. 11C is a rear view of the airbag, illustrating the airbag shape upon completion of the second folding process;

FIG. 18A is a front view of the airbag, illustrating an airbag shape obtained in a first step of a fourth folding process for the airbag according to one embodiment of the present invention;

FIG. 18B is a cross-sectional view taken along the line I-I of FIG. 18A, illustrating the airbag shape obtained in the first step of the fourth folding process;

FIG. 19A is a front view of the airbag, illustrating an airbag shape obtained in a second step of the fourth folding process for the airbag according to one embodiment of the present invention;

FIG. 19B is a cross-sectional view taken along the line J-J of FIG. 19A, illustrating the airbag shape obtained in the second step of the fourth folding process;

FIG. 20A is a front view of the airbag, illustrating an airbag shape obtained in a third step of the fourth folding process for the airbag according to one embodiment of the present invention;

FIG. 20B is a cross-sectional view taken along the line K-K of FIG. 20A, illustrating the airbag shape obtained in the third step of the fourth folding process;

FIG. 21A is a front view of the airbag, illustrating an airbag shape obtained in a fourth step of the fourth folding process for the airbag according to one embodiment of the present invention;

FIG. 21B is a cross-sectional view taken along the line L-L of FIG. 21A, illustrating the airbag shape obtained in the fourth step of the fourth folding process; and FIG. 21C is a front view of the airbag in its final form.

DETAILED DESCRIPTION

Hereinafter, an airbag folding method and an airbag apparatus according to one embodiment of the present invention will be described with reference to the drawings.

Figure 1:
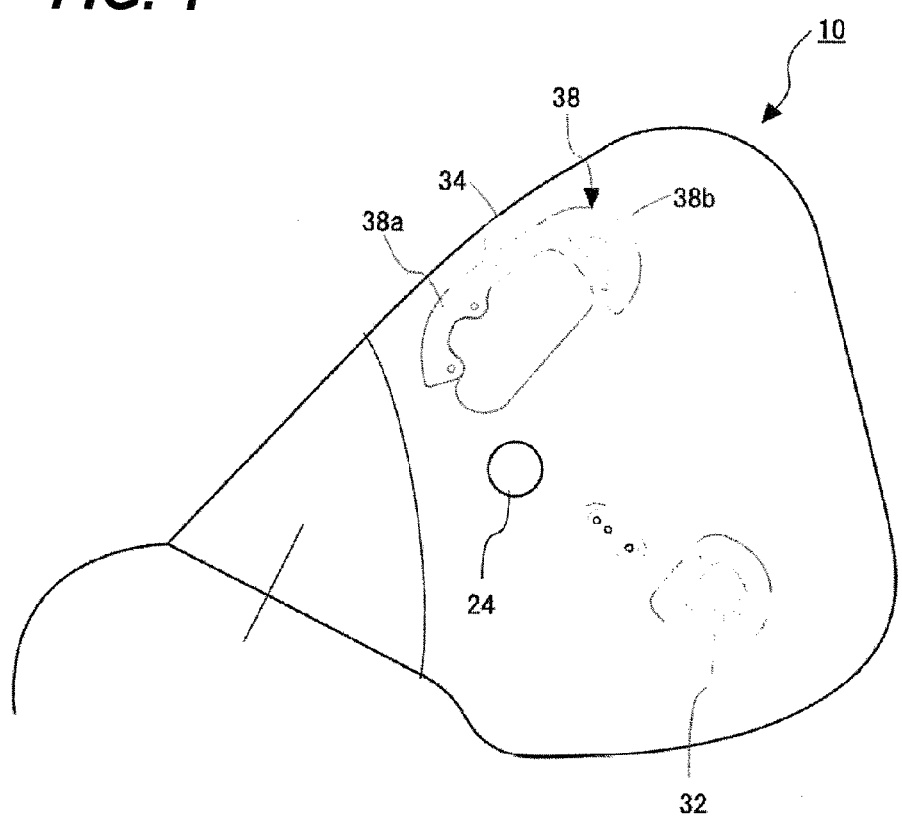
FIG. 1 is an explanatory diagram illustrating an inflated and deployed airbag according to one embodiment of the present invention.
Figure 2:
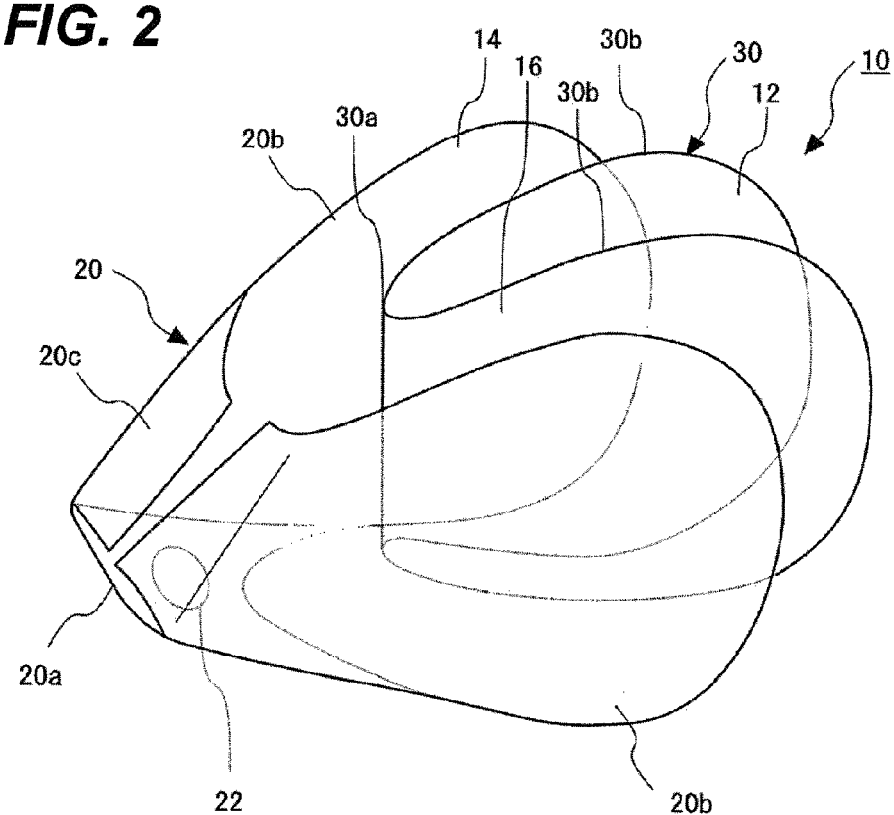
FIG. 2 is an explanatory diagram illustrating the airbag disassembled in three dimensions.
Figure 3A:
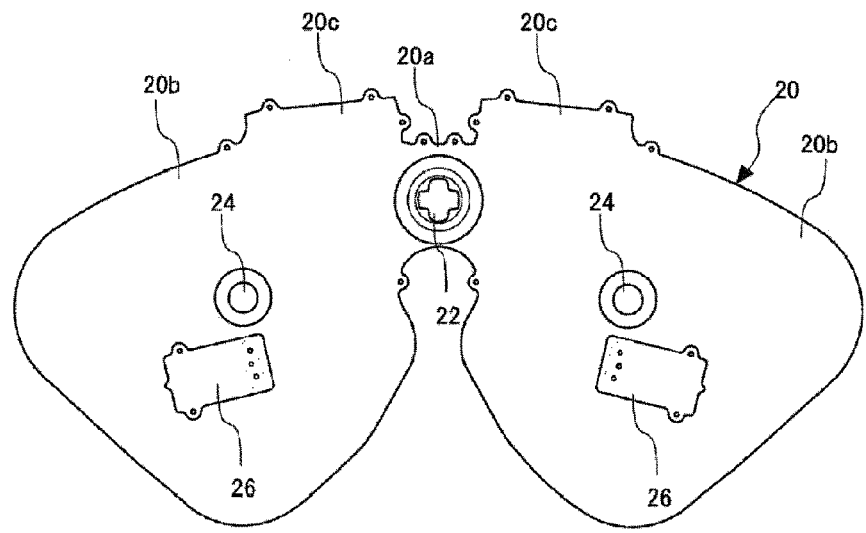
FIG. 3A is a plan view of an outer panel used in the airbag according to one embodiment of the present invention.
Figure 3B:
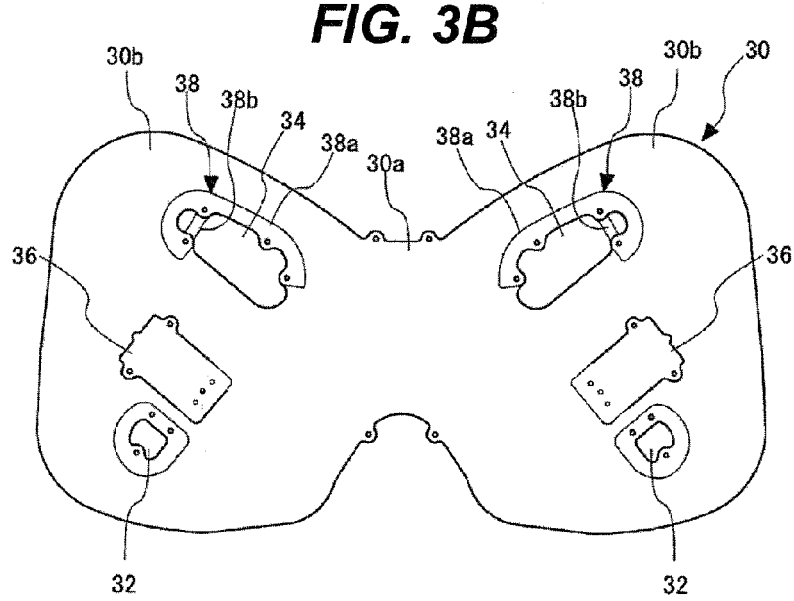
FIG. 3B is a plan view of an inner panel used in the airbag according to one embodiment of the present invention.
Figure 4:
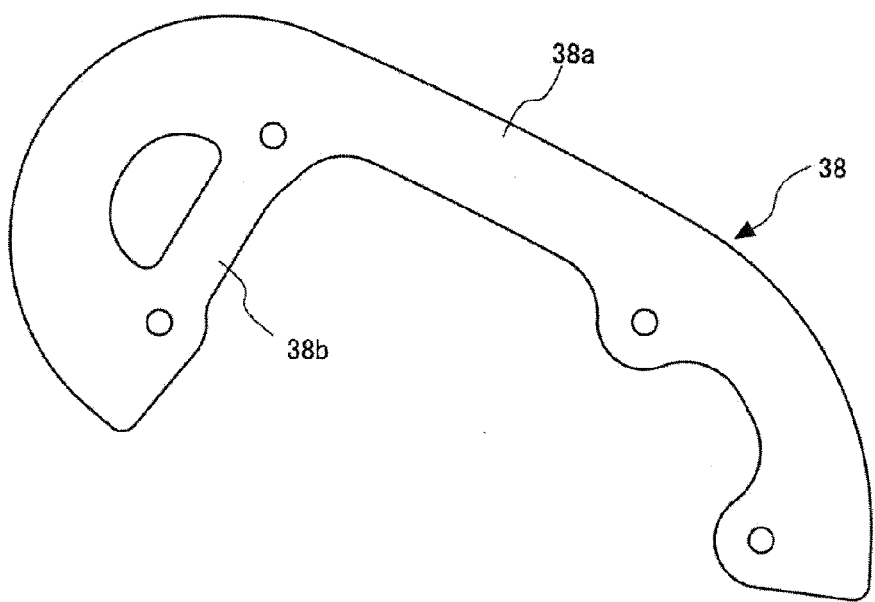
FIG. 4 is a plan view of an opening reinforcement panel used in the airbag according to one embodiment of the present invention.
Figure 5:
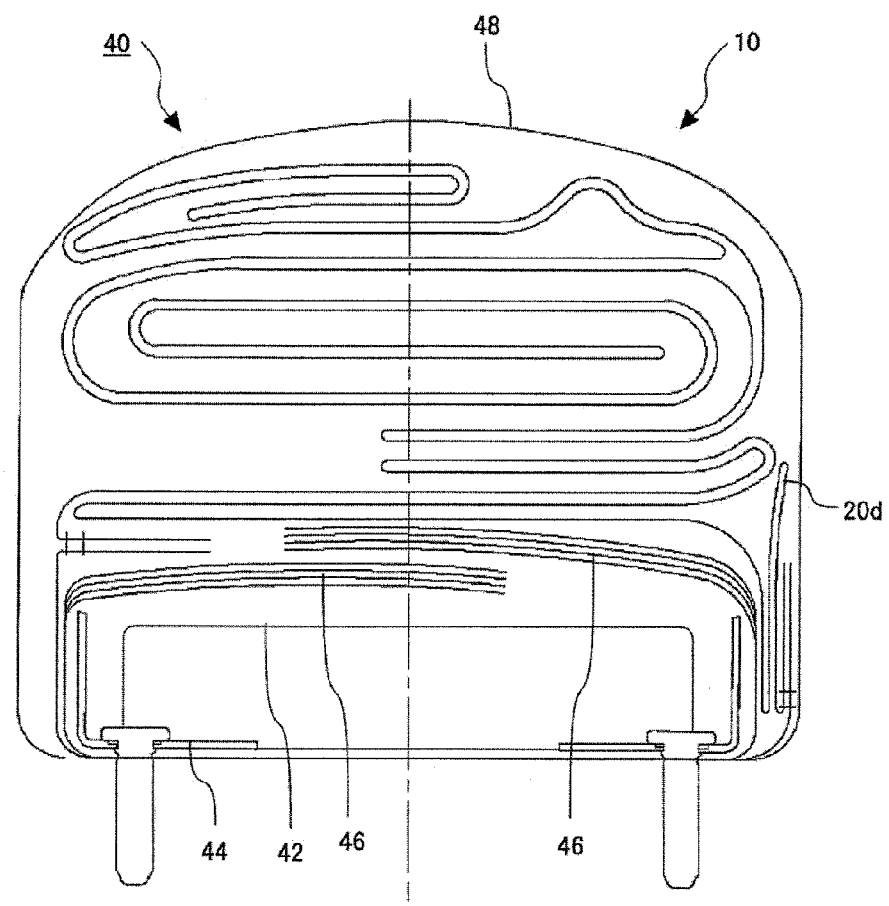
FIG. 5 is an explanatory diagram illustrating an airbag apparatus according to one embodiment of the present invention.
Figures 6A, 6B, 6C:
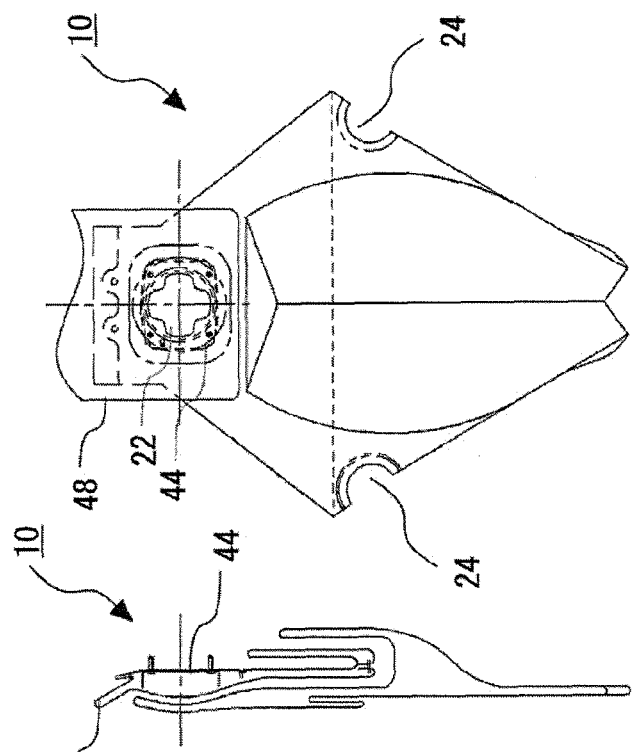
FIG. 6A is a front view of the airbag, illustrating an airbag shape after a first folding process for the airbag according to one embodiment of the present invention.
FIG. 6B is a cross-sectional view taken along the line A-A of FIG. 6A, illustrating the airbag shape after the first folding process.
FIG. 6C is a rear view of the airbag, illustrating the airbag shape after the first folding process.
Figure 7:
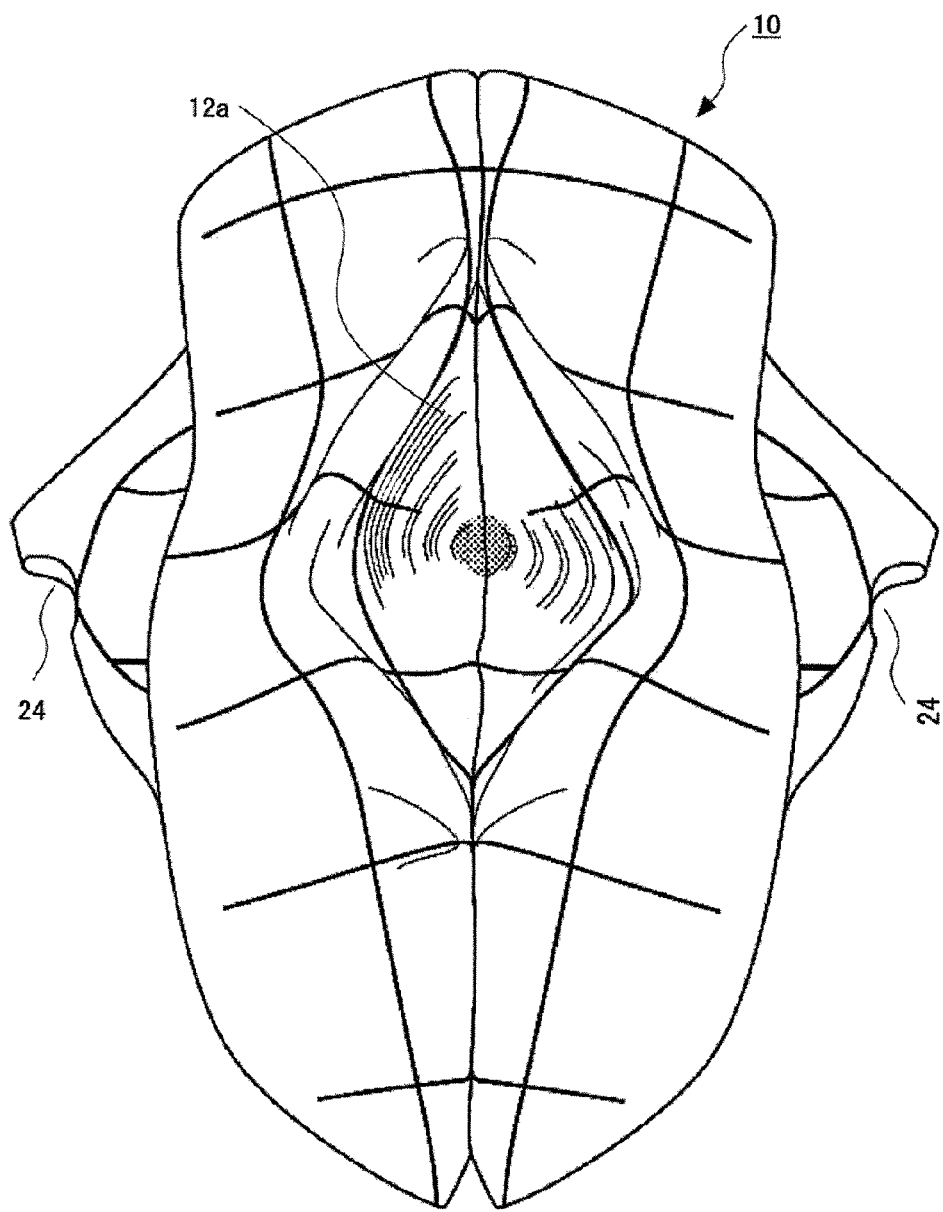
FIG. 7 is an explanatory diagram illustrating a first step of forming the airbag shape in the first folding process for the airbag according to one embodiment of the present invention.
Figure 8:
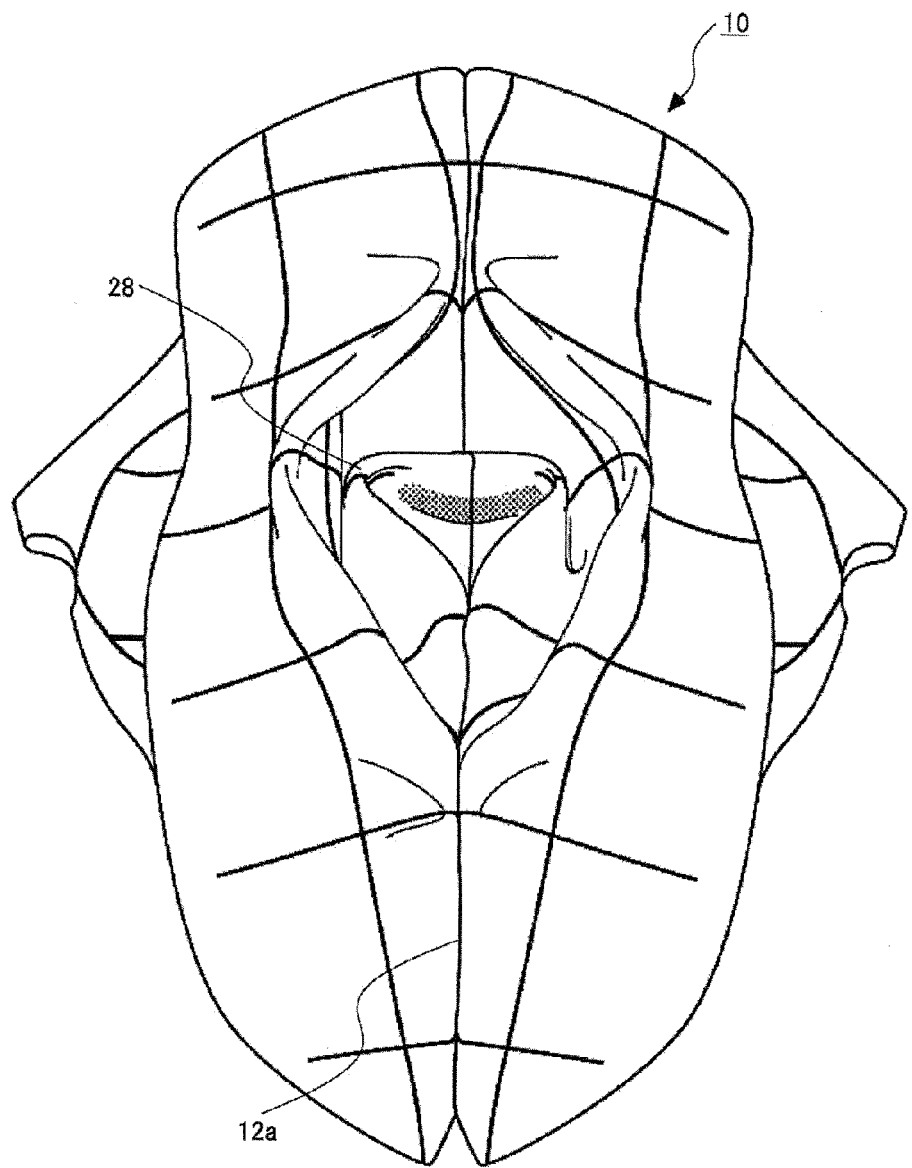
FIG. 8 is an explanatory diagram illustrating a second step of forming the airbag shape in the first folding process for the airbag according to one embodiment of the present invention.
Figure 9:
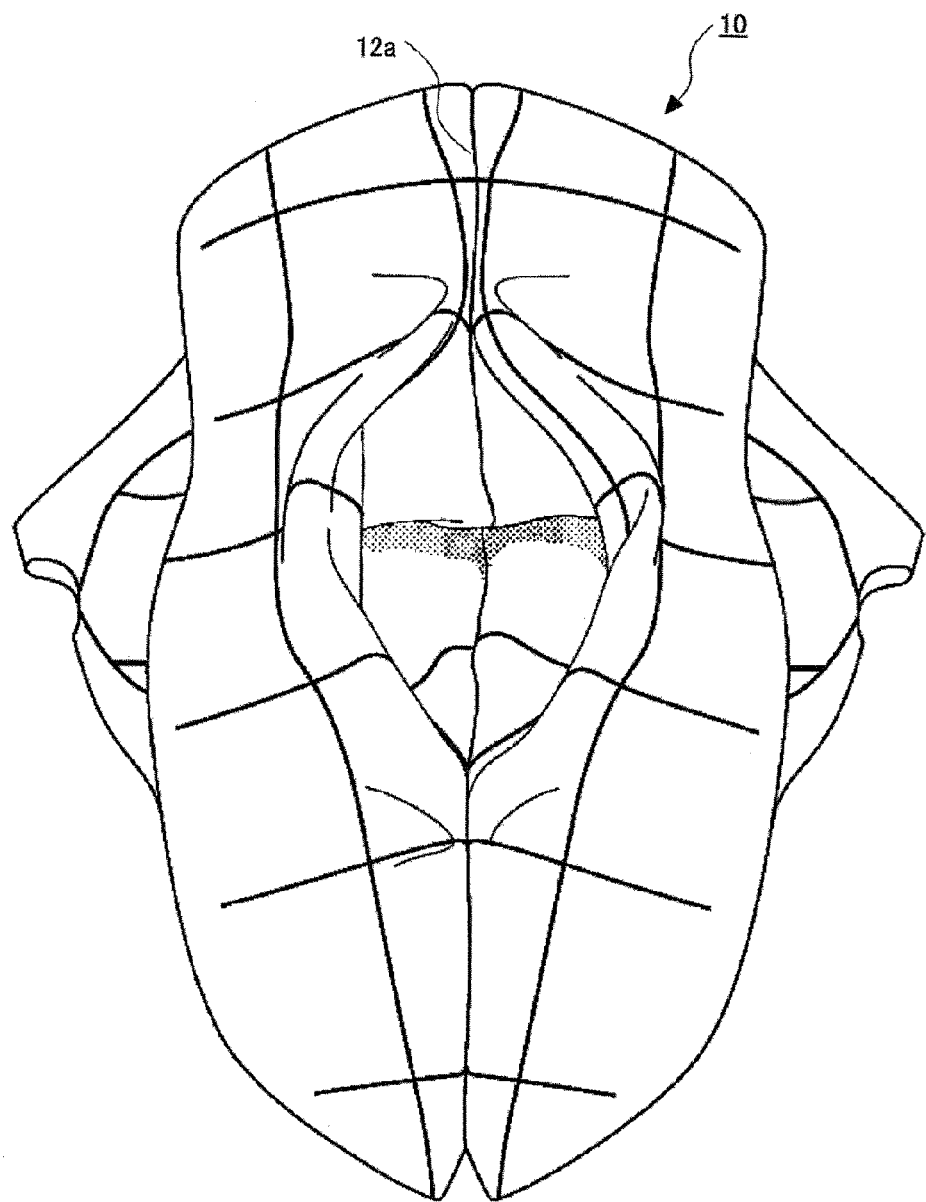
FIG. 9 is an explanatory diagram illustrating a third step of forming the airbag shape in the first folding process for the airbag according to one embodiment of the present invention.

FIG. 1 is an explanatory diagram illustrating an inflated and deployed airbag according to one embodiment of the present invention. FIG. 2 is an explanatory diagram illustrating the airbag according to one embodiment of present invention disassembled in three dimensions. FIG. 3A is a plan view of an outer panel used in the airbag according to one embodiment of the present invention. FIG. 3B is a plan view of an inner panel used in the airbag according to one embodiment of the present invention. FIG. 4 is a plan view of an opening reinforcement panel used in the airbag according to one embodiment of the present invention. FIG. 5 is an explanatory diagram illustrating an airbag apparatus according to one embodiment of the present invention. FIG. 6A is a front view of the airbag, illustrating an airbag shape upon completion of a first folding process for the airbag according to one embodiment of the present invention. FIG. 6B is a cross-sectional view taken along the line A-A of FIG. 6A, illustrating the airbag shape upon completion of the first folding process. FIG. 6C is a rear view of the airbag, illustrating the airbag shape upon completion of the first folding process. FIGS. 7 to 10 are explanatory diagrams illustrating first to fourth steps of forming the airbag shape in the first folding process for the airbag according to one embodiment of the present invention, respectively. FIG. 11A is a front view of the airbag, illustrating an airbag shape upon completion of a second folding process for the airbag according to one embodiment of the present invention. FIG. 11B is a cross-sectional view taken along the line B-B of FIG. 11A, illustrating the airbag shape upon completion of the second folding process. FIG. 11C is a rear view of the airbag, illustrating the airbag shape upon completion of the second folding process. FIGS. 12A to 17B are front views or cross-sectional views illustrating airbag shapes obtained in first to sixth steps of a third folding process for the airbag according to one embodiment of the present invention. FIGS. 18A to 21B are front views or cross-sectional views illustrating airbag shapes obtained in first to fourth steps of a fourth folding process for the airbag according to one embodiment of the present invention. FIG. 21C is a front view of the airbag in its final form.

Referring to FIGS. 1 to 2, an airbag 10 according to the present invention includes an outer panel 20 and an inner panel 30 which are assembled into a bag shape by sewing so that a right chamber 14 (located in a right side region of the airbag 10 with respect to an occupant) and a left chamber 16 (located in a left side region of the airbag 10 with respect to the occupant) are formed and a concave region 12 is substantially located at a center of a width direction of the airbag 10 at the time of inflation and expansion thereof.

As illustrated in FIG. 3A, the outer panel 20 is provided at its center with an introduction port 22 for pressure gas, and has a substantially symmetrical eyeglass-like shape. The outer panel 20 further includes: a bottom wall portion 20a provided with the introduction port 22 and constituting a bottom wall surface at the time of airbag inflation and expansion; outer wall portions 20b mainly constituting right and left outer wall surfaces at the time of airbag inflation and expansion; and an upper wall portion 20c constituting an upper wall surface at the time of airbag inflation and expansion. Moreover, in the outer wall portions 20b of the outer panel 20, there are formed gas escape holes 24 for escape of pressure gas introduced through the introduction port 22 at the time of inflation and expansion. At an inner surface of each outer wall portion 20b of the outer panel 20, one end of a restriction band 26 is provided by sewing, for example. Each restriction band 26 restricts inflation toward the rear of a vehicle body to ensure expansion in a lateral direction of the vehicle body at the time of airbag inflation and expansion.

As illustrated in FIG. 3B, the inner panel 30 includes a bottom wall portion 30a and inner wall portions 30b, and has a substantially symmetrical butterfly-wing-like shape. A center region of the bottom wall portion 30a constitutes a bottom wall surface of the concave region 12 (i.e., a front surface thereof with respect to the occupant). The inner wall portions 30b are connected to peripheral edges of the outer panel 20 by sewing, and constitute, at the time of inflation and expansion, right and left inner wall surfaces facing each other, with the concave region 12 sandwiched therebetween. The inner wall portions 30b of the inner panel 30 are each provided with gas escape holes 32 and 34 for escape of pressure gas introduced through the introduction port 22 at the time of inflation and expansion. Furthermore, at an inner surface of each inner wall portion 30b of the inner panel 30, one end of a restriction band 36 is provided by sewing, for example. Each restriction band 36 restricts inflation toward the rear of the vehicle body to ensure expansion in the vehicle body lateral direction at the time of airbag inflation and expansion. Note that the other end of each restriction band 36 is connected to the other end of the associated restriction band 26 by sewing, for example. The gas escape holes 32 and 34 are formed so as to allow gas escape when the occupant is received by either the right chamber 14 or the left chamber 16 at the time of airbag inflation and expansion. Opening areas of the gas escape holes 34 are larger than those of the gas escape holes 32. In this case, in consideration of a distribution of concentration of pressure applied to an opening edge of the gas escape hole 34 having a larger opening area, the gas escape hole 34 is provided with a reinforcement panel 38 for reinforcing a region of the opening edge located along a pressure gas introduction direction (i.e., a direction in which the airbag 10 is inflated) in particular.

As illustrated in FIG. 4, the reinforcement panel 38 includes: a reinforcement piece 38a extending along a shape of the opening edge of the gas escape hole 34; and an adjustment piece 38b that closes part of the gas escape hole 34.

The reinforcement piece 38a is provided to extend along a downstream region of the opening edge of the gas escape hole 34 defined with respect to the pressure gas introduction direction. In this case, in consideration of a distribution of pressure concentration of pressure gas applied to the opening edge of the gas escape hole 34, the reinforcement piece 38a is provided within a given range including the region of the opening edge of the gas escape hole 34, located at the downstream side of the pressure gas introduction direction.

Thus, in contrast to a case where a reinforcement cloth extends across the entire circumference of the opening edge of the gas escape hole 34, the reinforcement piece 38a can achieve minimum necessary reinforcement, so that material cost can be cut down and a thick portion is reduced, thereby preventing trouble such as a thickness-induced deformation or increase in folding load at the time of folding. As a result, the reinforcement piece 38a can contribute not only to facilitation of folding but also to flattening.

The reinforcement piece 38a reinforces a given range, including a region that actually requires reinforcement, in consideration of a pressure distribution, thus making it possible to alleviate stress concentration on a border between a reinforced region and an unreinforced region and to inhibit unexpected pressure concentration in the vicinity of the border. Note that in the present embodiment, the reinforcement piece 38a is provided to reach a position adjacent to an upstream region of the opening edge of the gas escape hole 34, facing the downstream region of the opening edge of the gas escape hole 34 defined with respect to the pressure gas introduction direction. As a result, load can be distributed efficiently for a tensile force generated from the downstream region of the opening edge defined with respect to the pressure gas introduction direction.

The adjustment piece 38b is provided to extend between regions of the opening edge of the gas escape hole 34 facing each other, and closes part of the gas escape hole 34. Thus, strength of peripheral regions of the gas escape hole 34 can be ensured while priority is given to ensuring of the shape of the airbag 10 (see FIG. 1), i.e., the amount of gas escape, at the time of inflation and expansion so that the airbag 10 deploys into a shape that protects a desired occupant. Further, there is no need to sew the adjustment piece 38b to the inner panel 30. Accordingly, when the gas escape hole 34 is formed before the adjustment piece 38b is provided for design reasons, the adjustment piece 38b can be changed in width; for example, when an increase in the amount of gas escape is to be desired, the adjustment piece 38b can be cut afterward so as to be reduced in width, thus making it possible to easily perform fine adjustment of the opening area of the gas escape hole 34.

As illustrated in FIG. 5, the above-described airbag 10 is used for an airbag apparatus 40. The airbag apparatus 40 includes: an inflator 42 for supplying pressure gas to the airbag 10; a retainer 44 for storing the folded airbag 10 and for supporting the inflator 42; and an airbag cover (not illustrated) that holds the retainer 44 and forms an opening (not illustrated) through which the airbag 10 is inflated outward. In the present embodiment, the retainer 44 is provided with: tubular guides 46 through which pressure gas injected from the inflator 42 is guided into the airbag 10; and a cloth cover 48 that allows the folded airbag 10 to retain its shape when the airbag 10 is stored, and that is provided with a split so that the cover 48 splits apart easily at the time of inflation and expansion. These components are assembled at the time when the airbag 10 is folded.

As illustrated in FIG. 5, the guides 46 are located between the inflator 42 and the introduction port 22 in normal times; in addition, when pressure gas is discharged from the inflator 42, the guides 46 stand up to take on a tubular shape extending from the introduction port 22 to regions adjacent to the introduction port 22 inside the airbag 10.

Thus, resistance of the regions adjacent to the introduction port 22 to pressure gas can be increased. In this case, the guides 46 are each preferably made of the same base material as the airbag 10 and formed into a tubular shape, and at least two or more guides 46 are preferably superposed (in the present embodiment, the four guides 46 are superposed). In consideration of the pressure gas introduction direction, axes of the guides 46 may be inclined so that the axes of the guides 46 correspond to the introduction direction.

Moreover, in a region of the outer panel 20 constituting the introduction port 22, there is provided a substantially perfect circular reinforcement member 18 extending along an opening edge of the introduction port 22. The reinforcement member 18 is provided with a plurality of tongue pieces 18a (e.g., the four tongue pieces 18a in the present embodiment) protruded toward an inner region of the introduction port 22. Accordingly, as illustrated in FIG. 3A, the introduction port 22 has a substantially cross-like shape. Similarly to the guides 46, it is preferable that the two or more reinforcement members 18 are superposed.

The tongue pieces 18a can increase resistance of the introduction port 22 to pressure gas discharged from the inflator 42. At the same time, the tongue pieces 18a also function to restrict part of pressure gas, and thus can also increase resistance of the regions adjacent to the introduction port 22 to pressure gas. Note that the tongue pieces 18a are preferably protruded in a direction in which the tongue pieces 18a do not interfere with inflation and expansion of the airbag 10, i.e., in a direction in which the tongue pieces 18a do not interfere with introduction of pressure gas. However, in order to increase the foregoing resistance of the regions adjacent to the introduction port 22 to pressure gas, the tongue pieces 18a may be protruded in a direction in which the tongue pieces 18a interfere with introduction of pressure gas on purpose. In this case, pressure may be set in accordance with sizes of the tongue pieces 18a (e.g., widths or amount of protrusion thereof) and/or thicknesses of the tongue pieces 18a (e.g., a thickness of the fourfold tongue pieces 18a).

Hereinafter, folding processes for the airbag 10 according to the present invention will be described.

<First Folding Process>

First, as illustrated in FIGS. 6A to 6C, the outer panel 20 and the inner panel 30, sewn to each other, are flatly spread out, and formed into a substantially rectangular shape (rhombus shape in this example) so that the concave region 12 is located at a front surface (surface facing a worker). Note that the outer panel 20 and the inner panel 30, sewn to each other, may be formed into a different shape such as a vertically long symmetrical rectangular shape or a vertically long symmetrical elliptical or oval shape. In this case, the worker inserts his or her both hands into the inside of the airbag 10 through the gas escape holes 24 formed in the outer wall portions 20b of the outer panel 20, and spreads out the airbag 10 to remove wrinkles or unnecessary overlap from the regions of the outer panel 20 adjacent to the introduction port 22 in particular. Parts of the concave region 12 of the right and left panels are allowed to face each other by utilizing the sewn region of the outer panel 20 and the outer panel 20, thereby forming a groove 12a of the concave region 12. The groove 12a corresponds to a center line passing through the center of the introduction port 22. Moreover, a region of the outer panel 20 adjacent to the introduction port 22, i.e., a region of the bottom wall portion 20a adjacent to an edge of the introduction port 22 located at a front position (upper position) in the state where the airbag 10 is installed on the vehicle body, is utilized to extend the region of the outer panel 20 from a vehicle body front side edge of the introduction port 22 toward the front of the vehicle body and then fold back the region of the outer panel 20 toward the rear of the vehicle body, thereby forming a gas storage portion 20d having a bag-like shape in cross section. Note that the gas storage portion 20d is not to be folded until the subsequent folding processes are completed. Thus, when the airbag 10 is inflated and deployed, the gas storage portion 20d is inflated first to positively allow the airbag 10 to subsequently inflate and deploy toward the occupant (i.e., rightward in FIG. 1).

In the first folding process, when the entire outer shape of the outer panel 20 is formed into a substantially rhombus shape, part of the outer panel 20 is located at the front side (front surface), and therefore, at least other parts of the outer panel 20 are symmetrical with respect to the center line (groove 12a). Furthermore, right and left vertexes of the rhombus shape may be determined by using the gas escape holes 24 as reference positions, and the airbag 10 may be folded so that each gas escape hole 24, having a perfect circular shape, is formed into a semi-circular shape, thereby allowing each gas escape hole 24 to be used as one of reference positions for symmetry.

Figure 10:
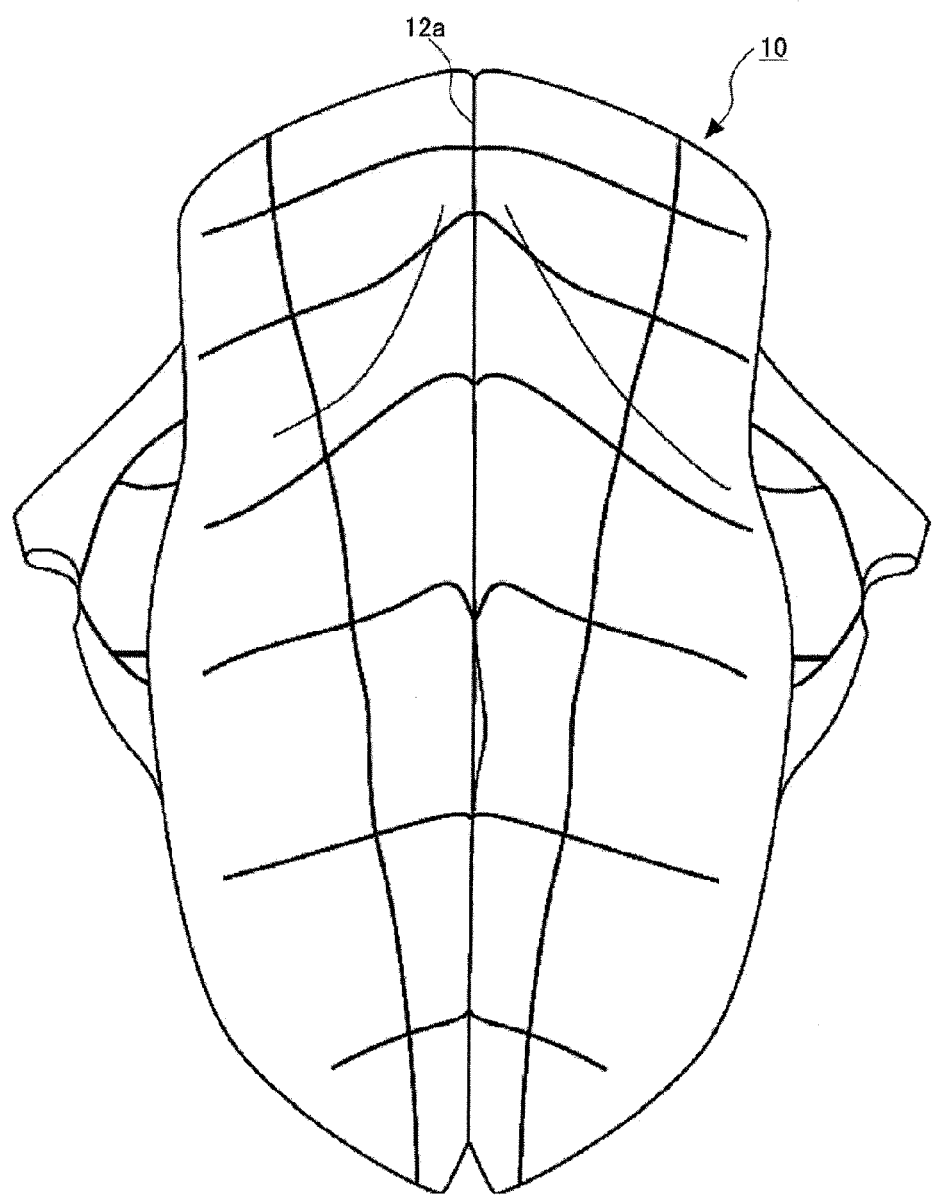
FIG. 10 is an explanatory diagram illustrating a fourth step of forming the airbag shape in the first folding process for the airbag according to one embodiment of the present invention (i.e., completion of the first folding process)

Therefore, for example, in parts of the panels located at inward positions, the groove 12a is temporarily opened (see FIG. 7) to form a tubular portion 28, for example, so as to remove wrinkles in redundant inward panel parts (see FIG. 8), and the tubular portion 28 is folded (see FIG. 9); then, the groove 12a is closed to ensure symmetry (see FIG. 10). Note that FIGS. 7 to 10 illustrate examples of works conducted in steps of the first folding process for the airbag 10 according to the present invention, and for the sake of convenience of description, imaginary lines are provided in a grid pattern on the airbag 10 in FIGS. 7 to 10. As described above, vertical and lateral balance is ensured with respect to the center line (groove 12a), thus facilitating subsequent folding works.

<Second Folding Process>

Next, as illustrated in FIGS. 11A to 11C, a line orthogonal to the center line and connecting the right and left vertexes of the substantially rhombus shape (see the broken line P1 in FIG. 6C) is used as a fold line to fold back rear side regions of the panels (base cloths) adjacent to the introduction port 22 so that the center line is not deviated.

<Third Folding Process>

Figure 12A:
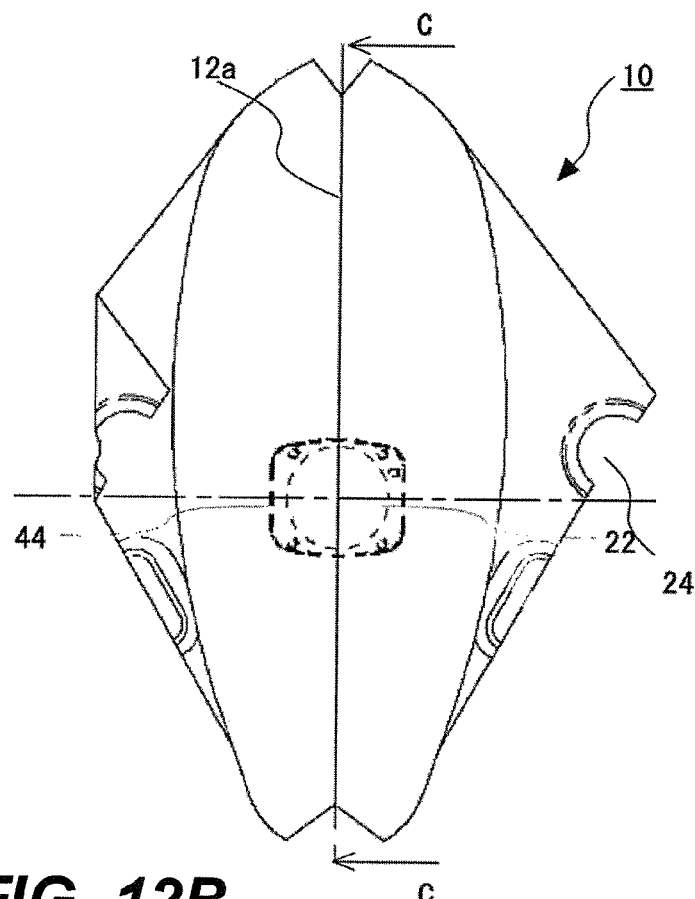
FIG. 12A is a front view of the airbag, illustrating an airbag shape obtained in a first step of a third folding process for the airbag according to one embodiment of the present invention.
Figure 12B:
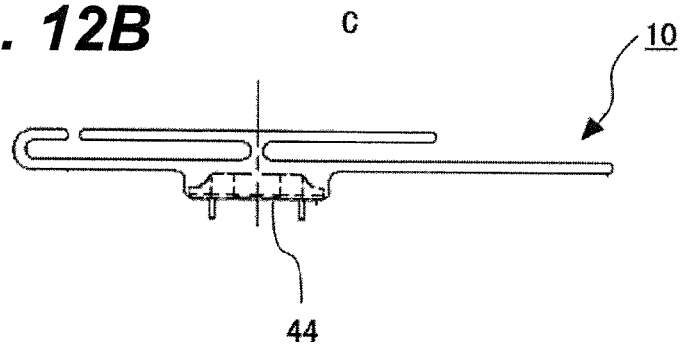
FIG. 12B is a cross-sectional view taken along the line C-C of FIG. 12A, illustrating the airbag shape obtained in the first step of the third folding process.
Figure 13A:
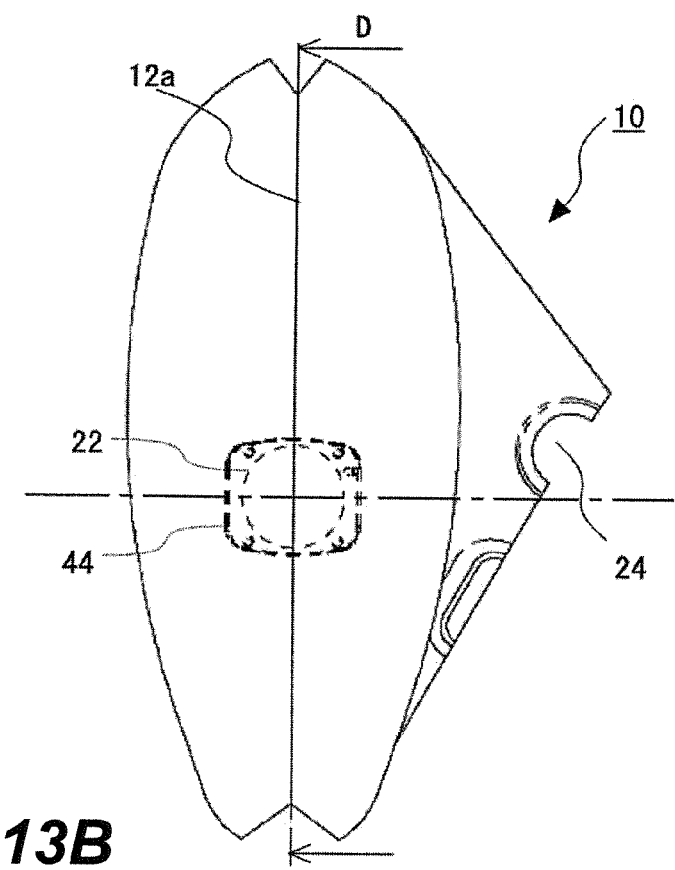
FIG. 13A is a front view of the airbag, illustrating an airbag shape obtained in a second step of the third folding process for the airbag according to one embodiment of the present invention.
Figure 13B:
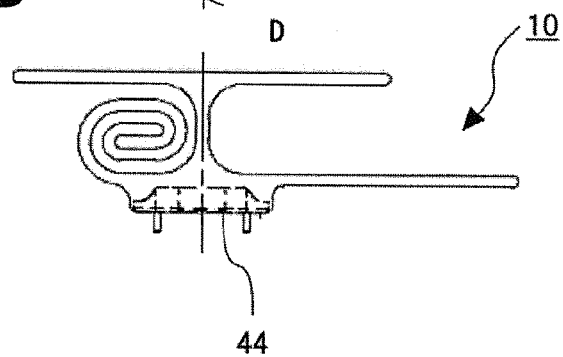
FIG. 13B is a cross-sectional view taken along the line D-D of FIG. 13A, illustrating the airbag shape obtained in the second step of the third folding process.

Next, the airbag 10 is inverted, and as illustrated in FIGS. 12A and 12B, one of the lateral vertexes of the rhombus shape is folded inward along a fold line parallel to the center line (first step). Then, as illustrated in FIGS. 13A and 13B, using an unillustrated metal plate or the like having a given width (e.g., about 6 cm), for example, the folded region is further folded so as to be rolled up a few times (e.g., three times), and is located under the front side (front surface) panel region (second step).

Figure 14A:
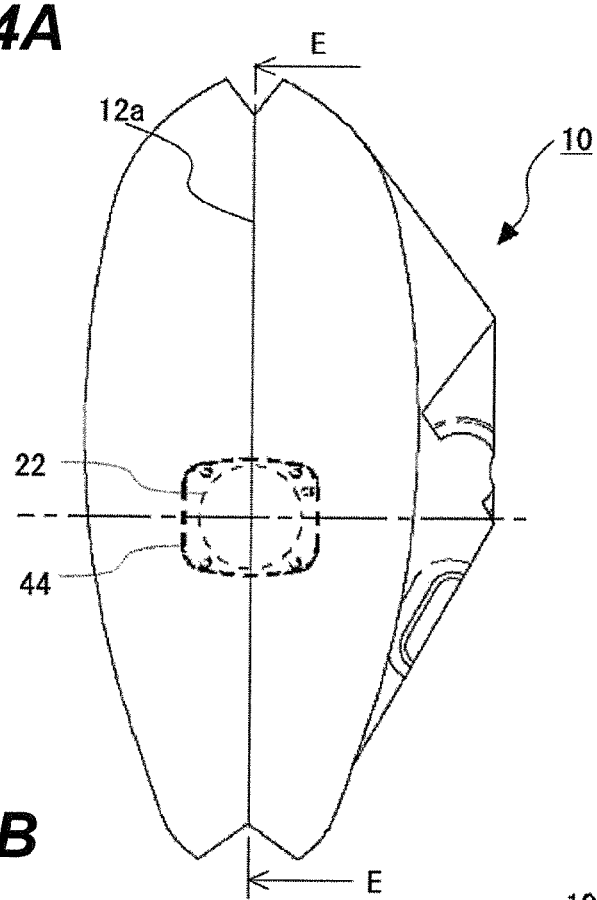
FIG. 14A is a front view of the airbag, illustrating an airbag shape obtained in a third step of the third folding process for the airbag according to one embodiment of the present invention.
Figure 14B:
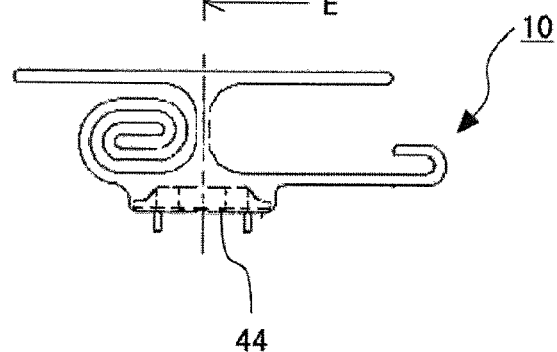
FIG. 14B is a cross-sectional view taken along the line E-E of FIG. 14A, illustrating the airbag shape obtained in the third step of the third folding process.
Figure 15A:
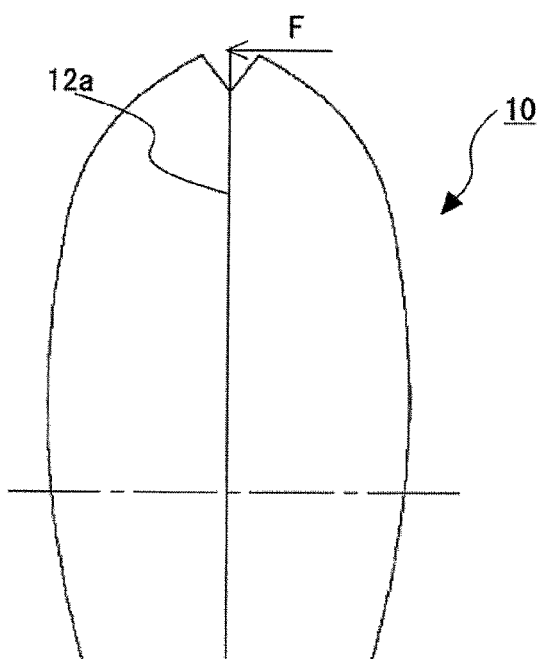
FIG. 15A is a front view of the airbag, illustrating an airbag shape obtained in a fourth step of the third folding process for the airbag according to one embodiment of the present invention.
Figure 15B:
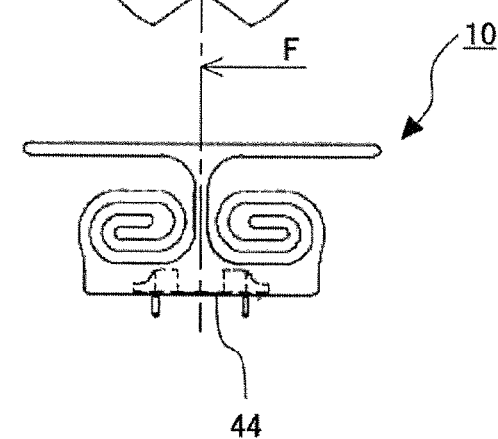
FIG. 15B is a cross-sectional view taken along the line F-F of FIG. 15A, illustrating the airbag shape obtained in the fourth step of the third folding process.

Similarly, as illustrated in FIGS. 14A and 14B, the other lateral vertex of the rhombus shape is folded inward along a fold line parallel to the center line (third step). Then, as illustrated in FIGS. 15A and 15B, using an unillustrated metal plate or the like having a given width (e.g., about 6 cm), for example, the folded region is further folded so as to be rolled up a few times (e.g., three times), and is located under the front side (front surface) panel region (fourth step). Note that in this step, the airbag 10 apparently has a vertically asymmetrical and substantially elliptical shape similar to a surfboard-like shape.

Figure 16A:
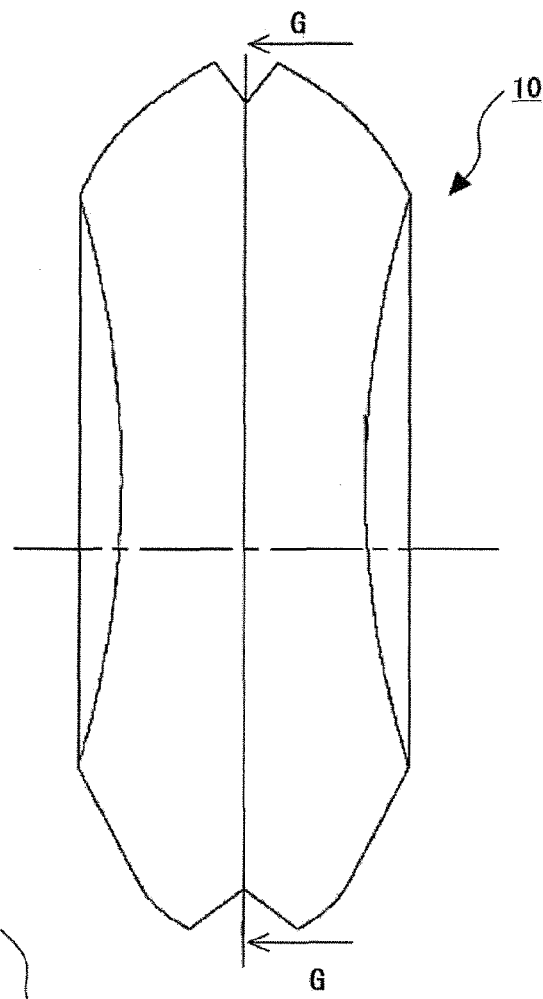
FIG. 16A is a front view of the airbag, illustrating an airbag shape obtained in a fifth step of the third folding process for the airbag according to one embodiment of the present invention.
Figure 16B:
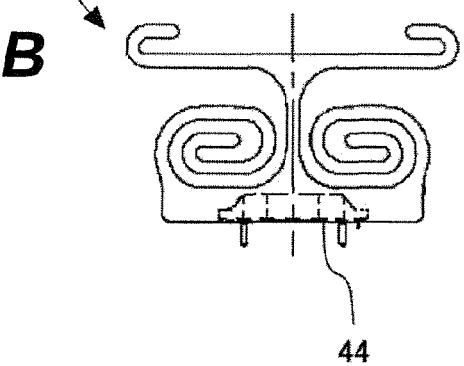
FIG. 16B is a cross-sectional view taken along the line G-G of FIG. 16A, illustrating the airbag shape obtained in the fifth step of the third folding process.
Figure 17A:
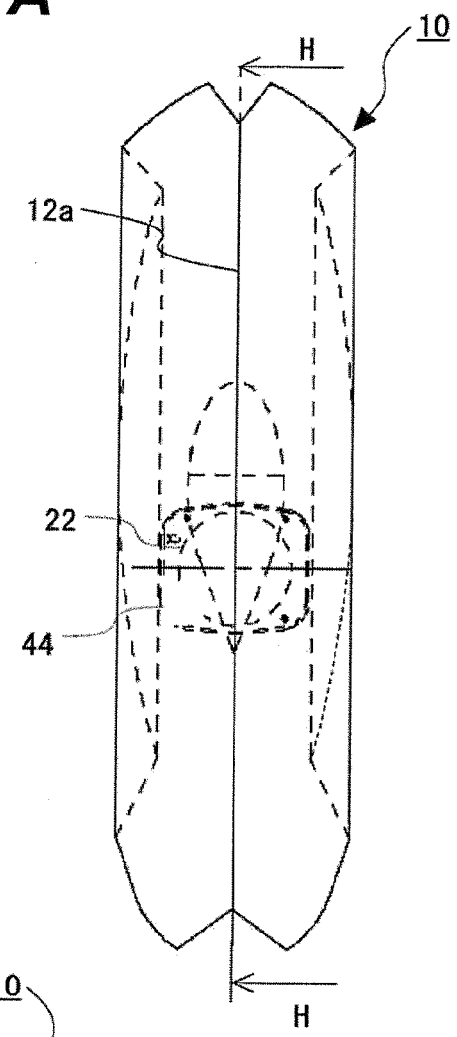
FIG. 17A is a front view of the airbag, illustrating an airbag shape obtained in a sixth step of the third folding process for the airbag according to one embodiment of the present invention.
Figure 17B:
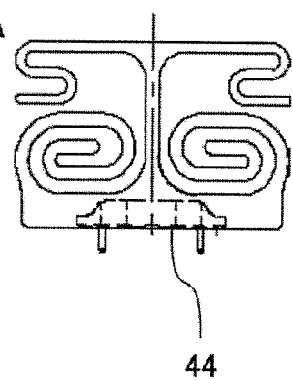
FIG. 17B is a cross-sectional view taken along the line H-H of FIG. 17A, illustrating the airbag shape obtained in the sixth step of the third folding process.

Then, regions of the panels located adjacent to the right and left vertexes are folded back toward the front side as illustrated in FIGS. 16A and 16B (fifth step), and are subsequently further folded back toward the rear side as illustrated in FIGS. 17A and 17B (sixth step), thus ending the folding process for the right and left sides of the airbag 10.

<Fourth Folding Process>

Furthermore, regions of the panels located at ends of the center line are folded as follows. For example, as illustrated in FIGS. 18A and 18B, lower (bottom) regions of the panels are folded along a fold line orthogonal to the center line so as to be rolled up a few times (first step). Subsequently, as illustrated in FIGS. 19A and 19B, upper (top) regions of the panels are folded back downward along a fold line orthogonal to the center line (second step). Then, tips of the panels are folded back toward the front side (substantially toward the rear side) along a fold line orthogonal to the center line as illustrated in FIGS. 20A and 20B (third step), and are further folded so as to be sequentially rolled up as illustrated in FIGS. 21A and 21B (fourth step), thus completing the folding works (see FIG. 21C).

As described thus far, in the present embodiment, the groove 12a of the concave region 12 corresponds to the center line passing through the center of the introduction port 22, and the airbag 10 is folded in such a manner that its symmetrical shape is maintained with respect to the center line. Thus, folding of an asymmetrical redundant panel piece is unnecessary, thereby making it possible to prevent an increase in package volume (i.e., an increase in thickness) when the airbag 10 is stored.

In addition to the features already described above, the methods of the present embodiment and variations thereof may be used in combination as appropriate.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

The invention claimed is:

1. An airbag folding method for folding an airbag, the airbag being formed in a bag shape and, when inflated and deployed, comprising: an outer panel formed in a substantially symmetrical shape and comprising: a right outer wall surface; a left outer wall surface; and an introduction port for a pressure gas provided between the right outer wall surface and the left outer wall surface; and an inner panel formed in a substantially symmetrical shape and joined to the outer panel at a peripheral edge of the outer panel and comprising: a right inner wall surface and a left inner wall surface facing the right inner wall surface, wherein a concave region is formed between the right inner wall surface and the left inner wall surface, wherein the airbag is folded in normal state and inflated and deployed in an emergency state by introducing the pressure gas to the airbag through the introduction port, the method comprising in the following order: (a) folding the inner panel and the outer panel into a symmetrical substantially rectangular shape such that a groove of the concave region is located along a center line and the introduction port is located adjacent to one end of the center line, wherein the center line passes through a center of the introduction port and symmetrically divides the inner and outer panels; (b) folding back a rear surface side of the inner and outer panels which is adjacent to the introduction port along a first fold line while the center line is not deviated from the groove of the concave region, wherein the first fold line is defined as a line orthogonal to the center line and connecting right and left vertexes of the substantially rectangular shape; (c) folding and rolling up the inner and outer panels along second fold lines from right and left edges thereof toward the center line symmetrically at the same width, wherein the second fold lines are substantially parallel to the center line; and (d) folding and rolling up the inner and outer panels along third lines from both ends of the center line toward the introduction port, wherein the third fold lines are substantially orthogonal to the center line.

2. The method according to claim 1, wherein in the steps (c) and (d), the inner and outer panels are rolled up between the introduction port and an airbag surface constituting the concave region.

3. The method according to claim 1, wherein in the step (a), a region of the outer panel, corresponding to a vehicle front side region of the introduction port, is extended from a vehicle front side edge of the introduction port toward the vehicle front side region, and then is folded back toward a vehicle rear side region, and wherein the step (d) comprises forming an unfolded region of the inner and outer panels as a gas storage portion formed in a bag shape in a cross-section.

4. An airbag apparatus comprising: the airbag which is folded by the method of claim 1; an inflator configured to supply a pressure gas to the airbag so as to inflate and deploy the airbag; a retainer in which the folded airbag is housed, the retainer being configured to support the inflator; and an airbag cover configured to hold the retainer and having an opening through which the airbag is inflated outward.

* * * * *